US009456620B2

(12) United States Patent
Loh et al.

(10) Patent No.: US 9,456,620 B2
(45) Date of Patent: *Oct. 4, 2016

(54) BAKE-STABLE CREAMY FOOD FILLING BASE

(71) Applicant: Intercontinental Great Brands LLC, East Hanover, NJ (US)

(72) Inventors: Jimbay P. Loh, Green Oaks, IL (US); Yeong-Ching Albert Hong, Kildeer, IL (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,206

(22) Filed: Feb. 26, 2014

(65) Prior Publication Data

US 2014/0205735 A1    Jul. 24, 2014

Related U.S. Application Data

(63) Continuation of application No. 13/531,759, filed on Jun. 25, 2012, now Pat. No. 8,691,316, which is a continuation of application No. 12/705,244, filed on Feb. 12, 2010, now Pat. No. 8,287,936.

(60) Provisional application No. 61/153,174, filed on Feb. 17, 2009.

(51) Int. Cl.
*A23D 9/007* (2006.01)
*A23L 1/09* (2006.01)
(Continued)

(52) U.S. Cl.
CPC ............. *A23D 9/007* (2013.01); *A23G 3/44* (2013.01); *A23V 2002/00* (2013.01)

(58) Field of Classification Search
CPC .. A23D 9/007; A21D 13/001; A21D 13/003; A21D 13/00; A21D 13/004
See application file for complete search history.

(56) References Cited

U.S. PATENT DOCUMENTS 3,741,774 A    6/1973  Burkwall, Jr.
4,283,430 A    8/1981  Doster et al.
(Continued)

FOREIGN PATENT DOCUMENTS

CA    2749086 A1    7/2010
EP    1197153 A1    4/2002
(Continued)

OTHER PUBLICATIONS

Patent Examination Report No. 1, dated Sep. 16, 2014 for Australian Patent Application No. 2010216131 (3 pgs.).
(Continued)

*Primary Examiner* — Erik Kashnikow
*Assistant Examiner* — Assaf Zilbering
(74) *Attorney, Agent, or Firm* — Fitch, Even, Tabin & Flannery LLP (57) ABSTRACT

Lipid-based, creamy food fillings are disclosed that are bake-stable up to a temperature of at least about 125° C. The creamy food fillings are particularly suitable for use in products that require the filling to be added prior to baking. In one aspect, the fillings are a solid-in-liquid dispersion having a dispersed solid phase including a hydrophilic powder and a high-melting lipid, as well as a continuous lipid phase including a low-melting lipid in which the hydrophilic powder and high-melting lipid are dispersed. Preferably, the fillings have a low water activity of about 0.5 or lower and are formed in the absence of additional humectants, thickening agents, or gelling agents.

35 Claims, 3 Drawing Sheets

(51) Int. Cl.
A23C 9/00 (2006.01)
A23D 7/00 (2006.01)
A23D 9/00 (2006.01)
A23G 3/44 (2006.01)

(56) References Cited

U.S. PATENT DOCUMENTS

| | | | |
|---|---|---|---|
| 4,482,575 | A | 11/1984 | Olds |
| 4,567,047 | A | 1/1986 | Wilson |
| 4,569,847 | A | 2/1986 | Andrews |
| 4,752,494 | A | 6/1988 | Tang et al. |
| 4,919,947 | A | 4/1990 | Barry et al. |
| 5,260,082 | A | 11/1993 | delValle et al. |
| 5,529,801 | A | 6/1996 | Morano |
| 5,599,575 | A | 2/1997 | Loh et al. |
| 5,723,164 | A | 3/1998 | Morano |
| 6,280,782 | B1 | 8/2001 | Hahn et al. |
| 6,472,006 | B1 | 10/2002 | Loh et al. |
| 6,528,104 | B1 | 3/2003 | Jindra et al. |
| 6,770,316 | B2 | 8/2004 | Jindra et al. |
| 6,863,911 | B2 | 3/2005 | Zimeri et al. |
| 6,905,719 | B2 | 6/2005 | Wang et al. |
| 6,905,720 | B2 | 6/2005 | Wang et al. |
| 7,452,564 | B2 * | 11/2008 | Jindra et al. ............ 426/657 |
| 8,287,936 | B2 * | 10/2012 | Loh et al. ............... 426/601 |
| 8,691,316 | B2 * | 4/2014 | Loh et al. ............... 426/601 |
| 2003/0021877 | A1 | 1/2003 | Cain et al. |
| 2004/0033202 | A1 | 2/2004 | Cooper et al. |
| 2004/0101601 | A1 | 5/2004 | Loh et al. |
| 2004/0166204 | A1 | 8/2004 | Smith et al. |
| 2004/0197459 | A1 | 10/2004 | Gaonkar et al. |
| 2004/0202764 | A1 | 10/2004 | Jindra et al. |
| 2004/0202770 | A1 | 10/2004 | Cain et al. |
| 2005/0249845 | A1 | 11/2005 | Mihalos et al. |

FOREIGN PATENT DOCUMENTS

| | | |
|---|---|---|
| EP | 1247460 A2 | 10/2002 |
| EP | 1449439 A1 | 8/2004 |
| EP | 1795257 B1 | 5/2013 |
| WO | 9409640 A1 | 5/1994 |
| WO | 9965339 A1 | 12/1999 |
| WO | 0234056 A2 | 5/2002 |
| WO | 2007017593 A2 | 2/2007 |

OTHER PUBLICATIONS

Calcium stearate from Wikipedia, the free encycolopedia, https://en.wikipedia.org/wiki/Calcium_stearate, dated Jan. 29, 2016 (2 pgs.).
First Office Action dated Oct. 29, 2012 for Chinese Patent Application No. 201080017282.6, English translation (21 pgs.).
Rejection Decision, dated Apr. 17, 2014 for Chinese Patent Application No. 201080017282.6, English translation 10 pgs.).
Notification to Grant Patent Right for Invetnion (PCT application entering the national phase) dated Jun. 25, 2015 for Chinese Patent Application No. 201080017282.6, English translation (2 pgs.).
Second Office Action dated Jun. 23, 2013 for Chinese Patent Application No. 201080017282.6, English translation (3 pgs.).
First Office Action dated Oct. 8, 2013 for Chinese Patent Application No. 201080017282.6, English translation (6 pgs.).
Communication Pursuant to Article 94(3) EPC dated Nov. 12, 2012 for European Patent Application No. 10705242.5 (4 pgs.).
Communication dated Mar. 24, 2014 for European Patent Application No. 14155831.2 (6 pgs.).
Communication dated Aug. 24, 2015 for European Patent Application No. 15172733.6 (7 pgs.).
Opposition to EP2398331 dated Feb. 6, 2015 for European Patent Application 10705242.5 (21 pgs.).
Substantive Examination Report mailed Dec. 2, 2014 for Philippines Patent Application No. 12011501617 (1 pg.).
Submission in Opposition Proceedings dated Sep. 17, 2015 for European Serial No. 2398331 (12 pgs.).
Office Action dated Dec. 3, 2013 for Russian Patent Application No. 2011137482, English translation (3 pgs.).
Office Action dated Nov. 7, 2013 for Ukrainian Patent Application No. a201111051, English translation (2 pgs.).
International Search Report dated Apr. 28, 2010 for International Application No. PCT/ US2010/024346.
International Preliminary Report on Patentability dated Aug. 23, 2011 for International Application No. PCT/US2010/02436.
R. D. McCormick, "Controlling Heat Stability For Bakery Fillings, Toppings," Food Product Development, 1974, vol. 8, No. 10, pp. 24 and 27, Abstract available only.
F. LaBell, "Low-Moisture Fruit Fillings Offer Stability And Microbiological Soundness To Bakery Products," Food Processing, 1982, vol. 43, No. 10, p. 36, Abstract available only.
"California Dreaming" (Reduced moisture filingd for cereal bars and cookies from California Custom Fruits and Flavors). Snack Food and Wholesale Bakery. date unknown. vol. 92. No. 1, p. 52, Abstract available only (believed to be publicly available at least one year prior to the filing date of this application).
"Keeping Taste Locked In," Bisciut World, date unknown, vol. 5, No. 3, pp. 22-23, Abstract available only (believed to be publicly available at least one year prior to the filing date of this application).
T. Louk, "New Generation of Bakery Fillings (from Rudolf Wild GmbH and Co. KG)," International Food Marketing and Technology, date unknown, vol. 15, No. 3, p. 6, Abstract available only (believed to be publicly available at least ane year prior to the filing date of this application).
Communication regarding Opposition, dated Apr. 7, 2016 for European Patent Application 10705242.5 (2 pgs.).
Office Action dated Feb. 18, 2016 for Canadian Patent Application No. 2752299 (5 pgs.).

* cited by examiner

BAKE-STABLE CREAMY FOOD FILLING BASE

CROSS-REFERENCE TO RELATED APPLICATION

This application is a continuation of U.S. patent application Ser. No. 13/531,759, filed Jun. 25, 2012, which is a continuation of U.S. patent application Ser. No. 12/705,244, filed Feb. 12, 2010, which claims the benefit of U.S. Provisional Application No. 61/153,174, filed Feb. 17, 2009, each of which is hereby incorporated herein by reference in its entirety.

FIELD

The field relates to a bake-stable and creamy food filling base and, in particular, to a shelf-stable and bake-stable, lipid-based creamy food filling suitable for low moisture foods.

BACKGROUND

Foods with textural contrast, such as crispy baked snacks with a creamy filling, can be appealing to a broad spectrum of consumers. These dual texture foods may include a lower water activity (Aw) crispy component, such as a cracker, and a filling component, such as a creamy, shelf-stable filling. The filling component, which may be lipid-based, typically exhibits the desired creamy texture from relatively small particles dispersed in a lipid continuous phase. However, such lipid-based filling components tend to have the shortcoming that the dispersion structure can be thermally destabilized in some instances leading to oiling-out and loss of creaminess upon heating. It is believed that such thermal destabilization may be the result of aggregation of the small particles leading to lipid separation from other filling ingredients. Thus, such shortcoming renders manufacture of the dual texture snack challenging.

In general, two approaches are commonly used to manufacture such dual texture snacks. By one approach, the crispy or cracker component, which is usually obtained from a dough, can be baked prior to applying the filling. In this case, the filling is not exposed to baking temperatures, and the shortcoming discussed above can be minimized or avoided. However, this approach can have limitations in terms of processing and limit product configurations, for example, to sandwich-type products. Another approach is to prepare a filled dough with the filling component injected therein and then baking the dough and the filling together. This approach is limited by the thermal instability of the filling component at baking temperatures, such as temperatures of about 110° C. or higher, commonly used for crackers, biscuits, baked chips, or other extruded/baked snacks. When the prior filling compositions are exposed to such baking temperatures, it can suffer from product defects such as boiling-out, oiling-out, loss of smoothness, and discoloration.

To address the stability problems of the filling component under commercial baking conditions, prior creamy filling compositions were generally formulated as water-based systems containing a hydrophilic liquid or aqueous continuous phase and dispersed oil droplets as an oil-in-water emulsion. The emulsion was then combined with relatively high amounts of water activity (Aw) lowering humectants (such as polyhydric alcohols like polyols, glycerol, sorbitol or other carbohydrate-based humectants such as polydextrose and the like), thickeners, and/or gelling agents (such as hydrocolloids, proteins, starches, and the like) to improve emulsion stability at commercial baking temperatures. See, for example, U.S. Pat. Nos. 4,752,494; 5,529,801; 6,863,911; 6,905,719; and 6,905,720. These prior fillings, however, are generally unacceptable from an organoleptic standpoint because they tend to be syrupy or gummy in texture and undesired as a creamy, savory filling (such as a cheese-flavored filling) due to unwanted sweetness and unpleasant aftertaste from the humectants (such as bitter aftertaste from glycerol). To achieve bake stability, such prior compositions tended to compromise desired organoleptic qualities due to these additional ingredients that tended to alter the desired taste, texture, and/or overall flavor of the filling and/or otherwise tended to lessen the eating experience expected by the consumer.

One example of a prior cheese-flavored filling is a low Aw, oil-in-water emulsion composition. In this prior filling, the water or hydrophilic phase is mainly made of glycerol (or other polyhydric alcohols), polydextrose syrup, corn syrup, and mixtures thereof. Such construction of these emulsion fillers may be generally stable at low temperatures, but under baking conditions the fillers are typically prone to boil-out or bleed-oil as the lipid phase can potentially undergo coalescence resulting in phase separation or inversion. In addition, the water in the hydrophilic continuous phase may also escape from the filling at baking temperatures resulting in blow-out of the dough or unwanted large voids in the dough envelope. These prior liquid-liquid emulsions also tend to be interfacially dynamic and their stability can be highly sensitive to shear, processing (e.g., extrusion, etc.), handling, and storage conditions.

SUMMARY

Lipid-based, creamy food fillings are disclosed that are bake-stable up to a filling temperature of at least about 125° C. and, in some cases, up to about 150° C. The creamy food fillings are particularly suitable for use in products that require the filling to be added prior to baking. In one aspect, the fillings are a solid-in-liquid dispersion. A continuous liquid phase includes at least one low-melting lipid, and a discontinuous or dispersed solid phase includes at least one hydrophilic powder and at least one high-melting lipid dispersed in the continuous liquid phase. The creamy food filling is bake-stable at oven temperatures up to about 250° C. or to filling temperatures up to about 125° C. and, in some cases, up to about 150° C. In this regard, the fillings exhibit substantially no filler spreading and substantially no oiling out or oil bleeding upon heating a sample of the filling for about 10 minutes at about 150° C. and, therefore, can be added to products prior to baking and still exhibit a smooth and creamy texture after being exposed to baking conditions up to about 250° C. Preferably, the fillings have a low water activity (Aw) of about 0.5 or lower and are suitable, among other applications, for low Aw crispy snacks such as a filled cracker and the like.

In another aspect, the creamy food filling has a particle size distribution that is effective to render the filling bake stable. By one approach, the particle size distribution may include at least about 90 volume percent of the particles less than about 30 microns and at least about 10 volume percent of the particles less than about 4 microns. By another approach, the particle size distribution may include a bi-modal particle size distribution with both a dust particle portion, which has a sub-distribution of particles generally less than about 4 microns, and a creamy particle portion, which has a sub-distribution of particles substantially greater than 1 micron in size, for example, between about 4 microns and about 100 microns.

While not wishing to be limited by theory, it is believed that the dust particle portion of the particle distribution includes a sufficient amount of sub-micron sized particles, which are believed to have substantial amounts of high-melting lipid particles and to be effective to substantially coat, substantially surround, and/or substantially form a barrier about the hydrophilic powder particles that helps to render the filling bake-stable. Again not wishing to be limited by theory, it is believed that the sub-micron particle barrier or spacer tends to delay, hinder, and/or prevent contact between or with the underlying hydrophilic powder particle. As a result, the sub-micron particle coating or barrier may delay or substantially prevent aggregation of the hydrophilic powders, which renders the filling stable against heat and/or moisture exposure over a range of milling, handling, and baking conditions.

DETAILED DESCRIPTION

A lipid-based, creamy edible filling is provided that remains stable at commercial baking temperatures and ambient storage conditions. Preferably, the fillings have a low water activity (Aw) and are suitable for, among other applications, low Aw snacks. As a result, the creamy fillings of this disclosure can be applied to low Aw cookies, crackers, biscuits, pastries, snacks, and other edible foods prior to baking and still retain a creamy texture after being exposed to baking temperatures. As described more below, the compositions and microstructures of the fillings herein have unique thermal and mechanical properties that make them ideal as a low Aw, lipid-based, creamy food composition that are suitable as a filling in low Aw, dual texture foods that benefit from the filling being applied prior to baking. As used herein, low Aw generally means about 0.5 or below.

In one aspect, the bake-stable, lipid-based creamy fillings have substantially no aqueous phase and are formed from at least one low-melting lipid, at least one high-melting lipid, and at least one hydrophilic powder that are milled to form particle sizes and distributions thereof that are effective to form a bake-stable filling that remains texturally creamy at practical commercial baking conditions. By one approach, the fillings herein are stable at oven temperatures up to about 250° C. or a filling temperature (obtained via oven or microwave for example) up to about 125° C., and in some cases, up to about 150° C. With substantially no aqueous phase, the creamy fillings herein are solid-in-liquid dispersions with a continuous liquid phase that includes the low melting lipid, and a dispersed or discontinuous solid phase that includes the hydrophilic powder and the high-melting lipid dispersed in the continuous liquid or oil phase.

In another aspect, the creamy fillers herein have less than about 70 percent of the hydrophilic powder, at least about 30 percent of the low-melting lipid, and at least about 0.5 percent of the high-melting lipid. By one approach, the creamy fillers may include a blend of about 30 to about 70 percent hydrophilic powder, about 30 to about 70 percent low-melting lipid, and about 0.5 to about 8 percent high-melting lipid with any remainder being optional fillers or food additives, such as colorants. Percentages used herein are by weight and based on the filling composition except as otherwise indicated.

In yet another aspect, a majority of the dispersed solid phase is the hydrophilic powder and the high melting lipid having a particle size distribution effective to aid in the bake stability of the filling. By one approach, the majority of the dispersed phase has a particle size of about 30 microns or less with a portion thereof having a particle size less than about 4 microns and an effective amount of sub-micron particles to achieve bake stability. By another approach, the creamy filling has a particle distribution including at least about 90 volume percent of the particles forming the dispersed phase with about 30 microns or less and at least about 10 volume percent of the particles about 4 microns or less. This can be expressed alternatively as a D90 of about 30 microns or less and a D10 of about 4 microns or less. In yet another approach, the particle microstructure has a multi-modal or at least a bi-modal particle distribution.

As mentioned above, the fillers herein preferably have little or no aqueous phase, and therefore, preferably include little to substantially no humectants (such as polyhydric alcohols like glycerol or other carbohydrate-based humectants like polydextrose and the like), gelling agents (such as gelling proteins, hydrocolloids, and the like) and/or thickeners (such as hydrocolloid gums, and the like) that tended to alter the taste and mouthfeel of the prior creamy fillers. Since the creamy fillings herein are substantially free of water, there is little functional need for humectants, gelling agents, or thickeners. As used herein, substantially no humectants, gelling agents, and/or thickeners generally means the creamy fillers have less than about 5 percent of such additional ingredients, in some cases less than about 2 percent of such ingredients, and in other cases less that about 1 percent humectants, gelling agents, and/or thickeners. Such amounts are generally ineffective to provide any functional benefit for the fillings disclosed herein. In yet other instances, the fillers have no humectants, gelling agents, and/or thickeners.

More particularly, the edible food fillings of the present disclosure are formed by milling the low-melting lipid, the hydrophilic powder, and the high-melting lipid ingredients at the same time and in certain ratios of solid-to-liquid and crystalline-to-amorphous relationships. In general, blending the ingredients separately or varying the solid, liquid, crystalline, or amorphous relationships produces a non-stable or non-functional product that either agglomerates the powder during or after milling or is not bake-stable. Milling the ingredients separately followed by blending tends to produce less functional or less stable products in addition to the added complexity and potential cost disadvantage in production.

Milling the ingredients at the same time not only reduces particle size, but also forms a unique microstructure or particle size distribution of the dispersed solid phase that is effective to aid in the bake stability. By one approach, the milling reduces the particle size of both the hydrophilic powder(s) and/or the high-melting lipid(s) and at the same time preferably forms a bi-modal or multi-modal microstructure or particle size distribution having at least two distinctly defined peaks or portions. As used herein, a bi-modal or multi-modal particle size distribution refers to a continuous distribution of particle size diameters that exhibit at least two distinctly defined modes or peaks of particle diameters across the distribution. In general, these two portions of the microstructure include a coarser or creamy particle portion including a distribution of larger particles and a finer or dust particle portion including a distribution of smaller particles.

Figure 1:
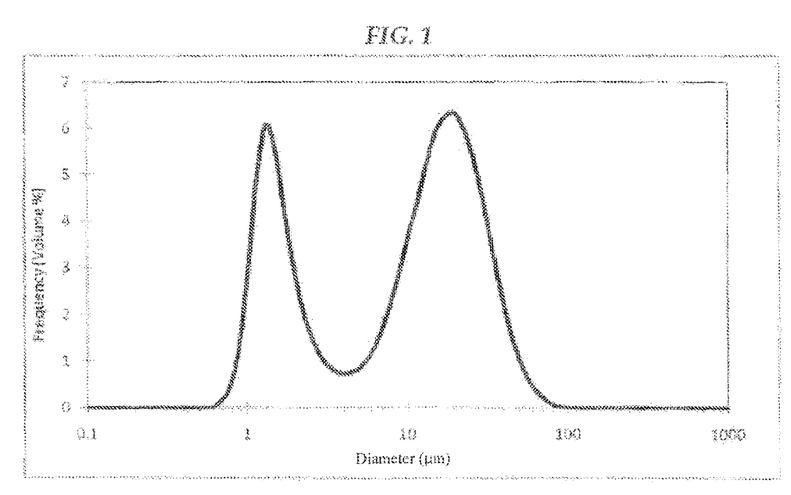
FIG. 1 is a graph of one example of a generic particle size distribution for bake-stable fillings herein.
Figure 2:
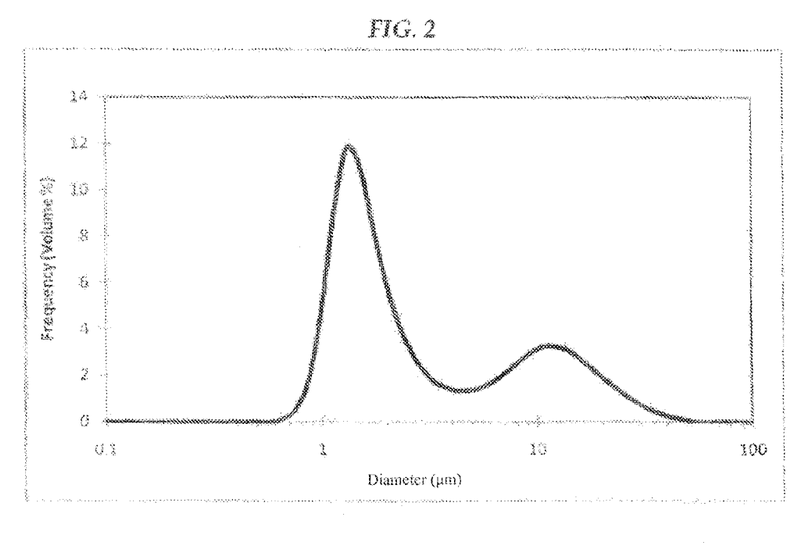
FIG. 2 is a graph of another example of a generic particle size distribution for bake-stable fillings.

By one approach, it is believed that the creamy particle portion generally ranges from about 4 microns to about 100 microns (in some cases about 4 to about 30 microns) with an average diameter generally ranging between about 10 to about 30 microns. It is also believed that the creamy portion includes mainly the hydrophilic powders. The dust particle portion is believed to be a blend of the hydrophilic powders and the high-melting lipids, and generally ranges from about 0.5 microns to about 4 microns with an average diameter generally from about 1 to about 2 microns. In another approach, the filler has a ratio of the dust particle portion to the creamy particle portion of at least about 0.1. As generally shown in FIGS. 1 and 2, exemplary bi-modal or multi-modal microstructures of the dispersed phase are provided showing the dust particle portion as the peak on the left and the creamy particle portion as the peak on the right. Other multi-modal distributions may be possible depending on the compositions, milling conditions, and other factors.

By one approach, the dust particle portion (left distribution) includes mainly milled particles of the hydrophilic powders and/or the high-melting lipid and generally includes particles about 4 microns or less and has an effective amount of sub-micron particles of about 1 micron or less to aid in bake stability. It is believed that the sub-micron particles substantially include sub-micron sized high-melting lipid particles. The creamy particle portion (right distribution) is mainly milled hydrophilic powder having a particle size of about 4 to about 100 microns, and in some cases, about 4 to about 30 microns. It is believed that the hydrophilic powder tends to be unstable and prone to softening and aggregation at elevated temperatures (especially above its glass transition temperature), which causes the filling to lose creaminess and induce oiling. It is also believed that this inherent instability of the hydrophilic powders is overcome through the unique blends of multi-modal particle distributions that combine the hydrophilic powders with the high-melting lipids in the particular microstructures thereof.

It is believed that the inherent instability of the hydrophilic powders may be improved because the milled hydrophilic powder particles in the creamy portion are segregated by, have a covering about, or have a barrier layer thereabout via at least a portion of the particles from the dust particle portion and, in particular, the sub-micron sized and thermally stable high-melting lipid particles from the dust particle portion. While not wishing to be limited by theory, it is believed that the coating, barrier, or separation of the hydrophilic powder particles by the particles in the dust portion hinders, delays, and/or prevents direct surface contact to the hydrophilic powder, which reduces and, preferably, hinders aggregation of the hydrophilic particles during processing and baking. As a result, it is also believed that the bi-modal or multi-modal particle size distributions enable a creamy and smooth filler to be formed (with substantially no humectants, thickeners, and/or gelling agents) that does not agglomerate and/or oil-out during milling and upon subsequent handling and baking because the coating, barrier, or segregation limits direct contact to the underlying relatively unstable hydrophilic particle.

Again, not to be limited by theory, it is believed that without the dust particle portion of the high-melting lipids particles, the hydrophilic particles in the lipid suspension may tend to aggregate (causing loss of creaminess) and squeeze out liquid (i.e., causing oiling-out). The thickened liquid lipid continuous phase, generally due to the presence of the dust particle portion of high-melting lipid particles, may also help to inhibit the draining phenomenon, which can also contribute to or accelerate oiling-out. It is also believed that undesirable boiling-out is often related to the destabilization of the dispersion structure, and oiling-out occurs when the destabilized filler composition becomes fluid or free running during baking. In the present compositions, while not wishing to be limited by theory, it is believed that the thermally stable (high-melting) fine particle structure due to the dust particle portion and sub-micron fraction thereof tends to functions as a capillary network that can immobilize liquids (such as the low-melting lipid liquids) in much a similar fashion in which a fine sand particle network entraps large quantities of water. Since the lipid based filling of the present disclosure contains practically no water or aqueous phase, blow-out of the dough sheet or excessive void formation seen in the prior art emulsion-based fillings with an aqueous phase is practically not a problem with the fillers herein. For instance, substantially no aqueous phase means the compositions herein preferably contain less than about 8 percent water and, preferably, less than about 4 percent water.

Preferably, the combined mixture of the low-melting lipid, high-melting lipid, and the hydrophilic powder are milled together for a period of time sufficient to reduce the particle size to produce a creamy mouthfeel and to provide the desired particle size distributions and/or sub-populations of the high-melting lipid in order to effectively form the covering, barrier, or segregation about the hydrophilic powder particle for bake stability. By one approach, the combined mixture is milled for a time sufficient to reduce about 90 volume percent of the particles to a size less than about 30 microns and, preferably, less than about 20 microns as measured by particle size analysis. This can also be expressed as a D90 value of about 30 microns or less (D90 is a particle size of the 90th percentile or the particle size at which about 90 percent of particles in the sample are smaller than). The bake-stable filling also preferably includes at least about 10 volume percent, preferably at least about 20 volume percent, and most preferably at least about 30 volume percent of the dust particle portion with a particle size less than about 4 microns.

At the same time, the milling also preferably forms the bi-modal or multi-modal microstructure defining the creamy particle portion having particles generally between about 4 and 100 microns (in some cases about 4 and 30 microns), and the dust particle portion having particles about 4 microns or less. Within the dust particle portion, which is believed to include both the hydrophilic powders and high melting lipid, there is an amount of sub-micron sized, thermally stable particles in a portion or a sub-population including what is believed to mainly be the high melting lipid particles. As mentioned above, it is the presence of sufficient amounts of these sub-micron particles that are believed to be effective to stabilize the filling and, in particular, the hydrophilic powders thereof, up to at least about 125° C., and in some case, up to about 150° C. as discussed above.

It has been discovered that the mixture of the low-melting lipid, hydrophilic particle, and high-melting lipid preferably needs to have sufficient quantities of the sub-micron particle portion from the high-melting lipid in order to sufficiently coat or form an adequate spacer or barrier covering about each of the hydrophilic particles. This is preferably obtained by milling the high- and low-melting lipids and hydrophilic powders at the same time. For example, the combined mixture is milled for a time sufficient to reduce the particle sizes of the powder and to also form the bi-modal or multi-modal microstructure including dust and creamy particle portions in the desired particle sizes and distributions.

After milling, it is believed that the dust particle portion may include at least about 0.1 percent, in some cases, up to about 0.5 percent, in other cases, up to about 2.5 percent, and in yet other cases, up to about 4 percent of sub-micron particles of high-melting lipid that are less than about 1 micron. While not wishing to be limited to theory, such amounts of high-melting lipid are believed to be effective to form a sufficient barrier or coating around the hydrophilic particles to render them bake-stable as discussed above. By one approach, it is believed that the milled filler may include between about 50 and about 90 percent of the creamy particle portion, between about 10 to about 50 percent of the dust particle portion with about 0.1 to about 4 percent of the dust particle portion being the sub-micron fraction of the high-melting lipid. It will be appreciated, however, that such amounts may vary depending on the formulation, initial particle sizes of the components, and other factors. While not wishing to be limited by theory, it is also believed that if there is not enough of the sub-micron portion of the high-melting lipid present in composition, then the composition may not be sufficiently bake-stable because an inadequate barrier or coating is formed. The presence of these sub-micron particles is generally shown by the SEM (Scanning Electron Microscope) image of FIG. 5, which is discussed more below in the Examples.

As mentioned above, the creamy food fillings of the present disclosure may also preferably have certain relationships of solid-to-liquid and crystalline-to-amorphous ratios to generally render the fillings suitable for co-milling and to aid in rendering them bake-stable. In general, milling or blending the ingredients separately or varying the solid, liquid, crystalline, or amorphous relationships produces a non-stable or non-functional product that either agglomerates upon milling or is not bake-stable.

In particular and by one approach, the fillings preferably have a ratio of total-solid-to-total-liquid (disperse ratio) of about 2.3 or less in order to be suitable for milling together and to be sufficiently bake-stable. The total solids mainly includes the high melting lipids and a majority of the hydrophilic powders (minus a certain amount of naturally occurring low-melting lipids in some hydrophilic powders, for example, milk fats in cheese powder). The total solids component may also include a ratio of hydrophilic powder to high-melting lipid, which in some cases may range from about 10 to 1 to about 100 to 1. The total liquid includes liquid lipids such as the low-melting lipids and any fats or oils naturally found in the hydrophilic powders. Too high a ratio tends to result in excessive viscosity that can render milling difficult due to pressure build-up and/or excessive temperature rise during milling. Elevated milling temperatures could further destabilize hydrophilic particles and is detrimental to dispersion stability and the creaminess of the resulting filling.

In another aspect, the bake-stable fillers have certain crystalline-to-amorphous ratios of the hydrophilic powders. It was determined that relative crystallinity of the hydrophilic powders may also aid the stability both during milling and subsequent baking. In general, a crystalline-to-amorphous ratio of the hydrophilic powders by weight of the total filling formula is about 0.5 or greater, in some cases, about 1.0 or greater, and in other cases, about 1.5 or greater (such as, for example, when the low-melting and/or high-melting lipid are less than about 55 percent of the filler composition). Since the stability of amorphous substances may be influenced by moisture and temperature, for purposes herein, any hydrophilic powders having a glass transition temperature of about 40° C. or lower at about 50 percent relative humidity (RH) are considered amorphous.

It is believed that too low a crystalline-to-amorphous ratio of the hydrophilic powder (i.e., too much of an amorphous content) can destabilize the filling during both milling and subsequent baking. In general, crystalline components of the powders include, but are not limited to, crystalline acids (such as citric acid, malic acid, and the like), mineral salts (such as sodium chloride, potassium chloride, and the like), crystalline carbohydrates (such as crystalline lactose, sucrose, starch, cellulose, fibers, and the like), and crystalline nitrogen-containing ingredients (such as crystalline proteins, mono-sodium glutamate, and the like). Amorphous powders include, but are not limited to, roller or spray dried powders from dairy ingredients (such as non-fat dry milk, cheese, cream, whey, and the like), carbohydrates (such as corn syrup solid, maltodextrin, instant starch, and the like), eggs, soy ingredients, fruits, vegetables, spices, and the like.

Suitable milling equipment includes high efficiency attrition mills such as, for example, ball mills, colloid mills, fluid energy mills, pin/disk mills, hammer mills, and the like. By one approach, a high efficiency attrition mill, such as a Dynomill (Glenmills, Inc., Clifton, N.J.) can be used to mill the mixture of some or all of the ingredients to form the dust particle portion, the sub-micron particle portion, and the creamy particle portion. As explained below, it is preferred that the hydrophilic powder, high-melting lipid, and low-melting lipid are milled together as a single mixture. As a result of this co-milling, it is believed that a sufficient quantity of the dust particle portion containing the sub-micron-sized high-melting lipid particles are generated and substantially surround, coat, and/or generally segregate each hydrophilic powder particle, which thus hinders, delays, and/or prevents direct surface contact and/or aggregation of the hydrophilic particles. This particle microstructure construction results in a lipid-based creamy and smooth filler to be formed that does not agglomerate and/or oil-out during milling and upon subsequent handling and baking.

The blend of the low-melting lipid, hydrophilic powder, and high-melting lipid mixture, which is preferably in the form of a coarse initial particle dispersion, is milled or co-milled at the same time and for a time and at a temperature above the melting point of the low-melting lipid but generally below the melting point of the high-melting lipid to form the solid-in-liquid dispersion. By one approach, it is generally preferred that the milling occurs at a temperature of about 10° C. to about 100° C. and, more preferably, about 40° C. to about 80° C. The milling occurs for a time sufficient to form the desired particle sizes and particle size distributions described above, which are effective to form a creamy texture of the lipid-based composition and to render the resultant composition bake-stable.

While it is appreciated that a larger quantity of the dust particle portion could be obtained upon increased milling times, it is believed that the formation of sufficient quantities of the dust particle portion during the initial stages of milling may be important in forming an immediate and sufficient covering, barrier, and/or segregation about the hydrophilic particles to limit aggregation. Therefore, it is believed that 
simply increasing the milling times is not sufficient to form a suitable particle covering, barrier, or segregation because the particles may already have agglomerated if not enough of the sub-micron high-melting lipid is initially present in the mixture. If not enough of the sub-micron particles are present early in the milling, the aggregation rate of the hydrophilic powder particles may overwhelm the production rate of the dust particle portion and the sub-micron high-melting lipid particles therein. It is believed this may be especially true if a high ratio of hydrophilic powders to low-melting lipid or to high-melting lipid is involved. Alternatively, part or all of the high-melting lipid could be milled separately and added to the rest of the filling composition prior to co-milling to ensure sufficient quantity of the sub-micron dust particle portion of the high-melting lipid is present in the initial stages of milling and in the finished milled product. In addition, there generally is a limitation to the amount of the dust particle portion of the high-melting lipid that can be included in the filling composition. Too much of the high-melting lipid in the composition has a tendency to develop an undesirable waxy mouthfeel when the filling is consumed. By one approach, suitable levels of the high-melting lipid to aid in achieving bake stability and exhibit the desired mouthfeel is about 0.5 to about 8 percent and, in other cases, about 1 to about 5 percent.

As understood by one of ordinary skill, milling tends to result in an increase of the overall temperature of the mixture even with a cooling system on the mill. As the temperature of the mixture approaches and exceeds the glass transition temperature of the hydrophilic powder, the hydrophilic (and particularly the amorphous portions of the hydrophilic powder) will undesirably undergo phase transition and tend to soften and aggregate, thereby compromising the smoothness and bake-stable characteristics of the filler and, in some cases, rendering it difficult to remove the mixture from a blender, mill, extruder, or other mixing apparatus. To counteract these tendencies of the hydrophilic powders at elevated temperatures, the formulations and processing conditions herein are carefully selected. By one approach, bake stability is obtained by at least one: the desired crystalline-to-amorphous ratios, the desired solid-to-liquid ratios, effective quantities of the dust particle portion including the sub-micron particles, and combinations thereof. Operating within one or more combinations of these desired relationships enables a low water activity, bake-stable, lipid-based filler to be made without substantial amounts of humectants, thickeners, and gelling agents as used in the prior art and without a substantial aqueous phase.

In another aspect, the lipid-based food fillings herein have a substantial modulus and/or significant yield stress across a wide range of temperatures. As generally used herein, substantial or significant modulus or yield stress refers to a rheological characterization that generally means the filling can stand up or otherwise retain its shape and will not flow against gravity or a shear stress encountered under baking condition. By one approach, the food fillings herein have a substantial or significant modulus of at least about 5 kPa across a temperature range of about 20° C. to about 150° C. and, preferably, a substantial or significant modulus of at least about 20 kPa across this temperature range. Further, the food filling has a low Aw of about 0.5 or less and, preferably, an Aw of about 0.4 or less, which makes the filling suitable for a low moisture food product particularly filled and baked products with creamy fillings and a crisp casing (such as a cracker). The low Aw of the food filling further contributes to shelf-stability of the filled and baked food composition. As used herein, shelf-stable primarily means microbiological stability that ensures the product safety. A shelf-stable food composition or product generally means that the composition is safe for consumption under normal ambient storage, distribution, and consumption conditions. In the context of the disclosure herein, it may be obtained by maintaining a sufficiently low Aw (i.e., about 0.5 or less). In addition, shelf-stable may also generally implies that the filling retains a substantially consistent physical, chemical, and quality stability, such as crispness of crackers, creaminess of the filling, and/or absence of defects (such as oiling-out and the like).

In an alternative aspect, the lipid-based food fillings herein can also be filled and baked in intermediate to high Aw casings and/or dough envelopes. For purposes herein, an intermediate Aw generally means between about 0.5 and about 0.85, and a high Aw generally means greater than about 0.85. With prior fillings, the direct addition of water into the filling tended to immediately destabilize the filling. With the fillings described herein, it has been discovered that when used in intermediate to high Aw casings and dough, moisture can be absorbed into the creamy, bake-stable filling through gradual moisture migration and equilibration from the casing or dough. Even with such moisture migrations, the fillings herein remain stable even after being equilibrated to a higher Aw, such as above about 0.5. Such unexpected physical stability allows the fillings herein to be used in intermediate Aw products, high Aw products, and in high humidity environments (such as up to about 80 percent relative humidity at 25° C.) for extended shelf life storage (such as, for example, up to at least about six months or longer).

Unlike the prior oil-in-water emulsion-based fillings, the resultant bake-stable food fillings provided in this disclosure generally exhibit the organoleptic properties of more traditional products (such as natural cheddar cheese) in flavor, taste, and creamy mouthfeel. Indeed, the edible food fillings herein are generally rapid and clean melting, free from residue, and have a creamy (i.e., smooth, non-sticky, non-syrupy, and non-waxy) appearance and mouthfeel. Additionally, the edible food filling compositions described herein possess a stable crystalline structure which resists the tendency to bloom or crumble over its shelf life and provide good stability against thermal abuse. In particular, the edible food fillings herein remain stable at elevated temperatures without substantial boil-out, oil-bleeding, or loss of creaminess.

Using a spread test, the bake stability can be evaluated. As generally used herein, the filling compositions are considered bake-stable because they have substantially no filling spread and substantially no oil-bleeding when about 15 grams of the filling composition in a semi-spherical shape, when applied to a filter paper base (such as Whatman #1 paper or equivalent), is exposed to about 150° C. for about 10 minutes. For purposes herein, substantially no filling spread should be less than about 1 cm beyond the outer edge of the original sample in a radial direction, preferably less than about 0.8 cm, and more preferably less than about 0.5 cm. Also for purposes herein, substantially no oil-bleeding should be less than about 2 cm beyond the outer edge of the original filling a radial direction, preferably less than about 1.5 cm, and most preferably less than about 1 cm. This spread test is more fully described in the Examples provided herein.

By one approach, suitable high-melting lipids have a melting point of at least about 70° C. or higher. Preferred high-melting lipids have melting points of about 100° C. or higher. Suitable high-melting lipids include edible long chain fatty acids, their monoglycerides, diglycerides, and triglycerides, their alkaline metal salts, and other derivatives thereof. Generally, the edible, high-melting lipids are formed from long chain fatty acids having at least 14 carbon atoms and preferably 18 to 26 carbon atoms; preferably, the long chain fatty acids are saturated. Suitable saturated long chain fatty acids used to form the edible, high melting fats include, for example, myristic acid, palmitic acid, stearic acid, arachidic acid, behenic acid, lignoceric acid, and the like; their derivatives, including, for example, glycerol monostearate, glycerol distearate, glycerol tristerate, calcium stearate, magnesium stearate, calcium palmatate, high-melting sucrose polyesters, high-melting fatty alcohols, high-melting waxes, and the like, as well as mixtures thereof. In addition, synthesized or chemically derived oils or oil substitutes may also be applicable, such as sucrose polyester of fatty acids. A preferred high-melting lipid is calcium stearate.

The hydrophilic powder suitable for use in the present food filler is preferably selected from dry flavor powders having primarily crystalline materials, but may include a mixture of crystalline and amorphous components with a moisture content less than about 8 percent and, preferably, less than about 4 percent. Suitable hydrophilic powders include dry flavoring powders having less than about 4 percent moisture and/or a glass transition temperature of about 25° C. or higher at about 50 percent relative humidity. Hydrophilic powders include any edible powder that is readily or substantially water-soluble or water-plasticizable rendering hydrophilic particles to soften, swell, and/or become sticky. By one approach, suitable hydrophilic powders include edible food powders containing at least one percent of water-soluble or water-plasticizable substances. Edible water-soluble or water-plasticiable substances include, but are not limited to, carbohydrate, protein, mineral salts (both organic and inorganic) and their complexes or combinations thereof. Edible water-soluble or water-plasticizable substances may further include edible dry powders derived from fruits, vegetables, herbs, spices, cereals, nuts, legumes, milks, meats, eggs, seafood, starch, flour, and the like. Examples of suitable hydrophilic powders include powders with cheese, fruit, vegetable, spice, sugar, salt, acidulants (citric acid, malic acid, and the like), flavorants (cream powder, fruit powder, spices, and the like), tastants (hydrolyzed protein, MSG, and the like), and like ingredients. By one approach, a suitable hydrophilic powder is a cheese powder, such as CHEEZTANG (Kraft Foods Ingredients, Memphis, Tenn.).

Suitable low-melting lipids generally include hydrogenated or non-hydrogenated fractionated or non-fractionated oils and their mixture thereof having a melting point of about 40° C. or lower. Suitable low-melting lipids include natural or partially hydrogenated vegetable or animal oils including, for example, coconut oil, palm kernel oil, rapeseed oil, soybean oil, palm oil, sunflower oil, corn oil, canola oil, cottonseed oil, peanut oil, cocoa butter, anhydrous milk fat, lard, beef fat, and the like, as well as mixtures thereof including oil soluble components derived therefrom, such phospholipids. Preferred edible, low-melting oils include coconut oil, palm oil, palm kernel oil, anhydrous milk fat, corn oil, soybean oil, canola oil, and mixtures thereof.

The mixture may also include optional additional ingredients or other food additives that may be blended therein either before or after milling. Examples of additional additives include fat-soluble color compounds, such as annatto and paprika extract and the like. As mentioned above, moisture bearing substances (such as wheat flour and the like) and thermally unstable substances (such as amorphous corn solids and the like) may be included, but if used are preferably less than about 15 percent by weight of the filling. In a further preferred embodiment, such moisture bearing and thermally unstable substances are substantially absent from the filling. Optionally, low-water activity, edible inlays (such as roasted nuts, chocolate, candy, dry fruits, dry vegetables, herbs, spices, and the like) may be added to the filler product after milling for flavor enhancement or cosmetic purposes as long as they do not disrupt the microstructure and/or the bake stability of the filling.

By one approach, it is believed that suitable bake-stable, lipid-based creamy fillings have the general formulas as provided in Table 1 below where, upon being milled, the crystalline-to-amorphous, solid-to-liquid, and/or sufficient quantities of high-melting lipid from the dust portion are combined to render the filling bake-stable.

TABLE 1

| Formulas | |
|---|---|
| Ingredient | Amount, % |
| Low Melting Lipid(s) | 30-70 |
| High Melting Lipid(s) | 0.5-8 |
| Dry Hydrophilic Powder(s) | 30-70 |
| Optional Ingredient(s) | 0-10 |

Advantages and embodiments of the fillers described herein are further illustrated by the following Examples. However, the particular conditions, processing schemes, materials, and amounts thereof recited in these Examples, as well as other conditions and details, should not be construed to unduly limit this method. All percentages are by weight unless otherwise indicated.

EXAMPLES

Comparative Example 1

A mixture of about 50 percent by weight cheese powder (SEQUOIA, Kraft Foods Ingredients, Memphis, Tenn.) containing amorphous materials, particularly about 10 percent maltodextrin and about 31 percent spray dried lactose, were mixed with about 50 percent by weight soy bean oil. The mixture was mixed using a lab impeller mixer without milling. Upon heating of the mixture, agglomeration occurred at approximately 40° C., resulting in oiling-out. At a temperature above 60° C., apparent lactose crystallization occurs resulting in complete oil separation and a physical change to a hard, sandy texture. As a result, thermally unstable and hydroscopic ingredients, such as amorphous lactose and maltodextrin, are believed to be detrimental to bake-stability.

Comparative Example 2

A mixture of 2 parts low lactose cheese powder (CHEEZTANG, Kraft Foods Ingredients, Memphis, Tenn.), 2 parts wheat flour, 1 part sugar, and 5 parts filler fat (an edible shortening-like fat) were prepared without milling by mixing the ingredients using a lab impeller mixture. Upon heating to about 50° C., agglomeration was observed, although oiling-out did not occur until about 80° C. At a temperature of 80° C. or greater, the mixture becomes pasty and sticky. As a result, simply blending ingredients without milling does not result in a bake-stable composition.

Comparative Example 3

A mixture of Table 2 below was evaluated for bake-stability without milling. First, an oil blend was prepared by mixing canola oil (CV 65 Canola Oil, Cargill, Idaho Falls, Id.), melted Palm Oil (Sans Trans 39 T15, Loders Croklaan, Channahon, Ill.), and Lecithin (Solec HR-2B, Solae LLC, St. Louis, Mo.) together. A dry blend of calcium stearate (CASPSK NF FCC Kosher, American International Chemical, Natick, Mass.), non-fat dry milk powder (Grade A—Low Heat, Non-Fat Dried Milk, Dairy America, Fresno, Calif.), and crystalline lactose (Edible Lactose Fine Grind, Davisco Foods International, Inc., Eden Prairie, Minn.) were blended together. Then, the dry blend was mixed together with the oil blend using an impeller mixer without milling to form a uniform mixture.

TABLE 2

| Mixture Ingredients | |
|---|---|
| Ingredients | Amount, % |
| Low-Melting Lipids | |
| Canola Oil | 22.0 |
| Palm Oil | 27.4 |
| Lecithin | 0.5 |
| High-Melting Lipid | |
| Calcium Stearate | 1.5 |
| Hydrophilic Powders | |
| Crystalline Lactose | 30.6 |
| Non-Fat Dry Milk | 18.0 |
| Milling | No |

For evaluating bake-stability, a small amount of a half-sphere room temperature sample was obtained using a small scoop (Cookie Scoop, Oneida Ltd, Oneida, N.Y.). The weight of this sample was about 14 to 16 grams. The sample was then carefully placed at the center of a piece of filter paper (Whatman #1 Filter Paper, 15 cm, Whatman International Ltd, England) which is placed inside a Pyrex petri dish. This dish was then heated in a pre-equilibrated oven at about 150° C. for about 10 minutes. After heating, the dish was removed from the oven and cooled on a bench top for about 5 minutes. The increase in radius of filler and oil-bleeding from the edge of initial filler were measured in centimeters using a ruler.

The results of bake-stability test for this Comparative Example are summarized in Table 3 below. This Comparative Example failed the bake-stability test and showed a significant amount of oil-bleeding and spread of filler after baking test. In addition, the baked sample also showed significant browning.

TABLE 3

| Results of Bake Stability Test | | | |
|---|---|---|---|
| | Spread of Filler | Oil-Bleeding | Overall |
| Comparative Example 3 | 2.2 cm | 5.2 cm | Failed |

Comparative Example 4

This Example used the same procedure and similar ingredients as Comparative Example 3 except the filler contained only 0.1 percent high-melting calcium stearate and used milling conditions as provided in Example 1 below. The mixture is provided in Table 4 below. This sample also failed the baking test with significant amount of oil-bleeding and spread of filler after heated in 150° C. oven for about 10 minutes. In addition, some degree of browning also occurred. Results are provided in Table 5 below.

TABLE 4

| Formulation | |
|---|---|
| Ingredients | Amount, % |
| Low-Melting Lipids | |
| Canola Oil | 22.0 |
| Palm Oil | 27.4 |
| Lecithin | 0.5 |
| High-Melting Lipid | |
| Calcium Stearate | 0.1 |
| Hydrophilic Powders | |
| Crystalline Lactose | 31.5 |
| Non-Fat Dry Milk | 18.0 |
| Milling | Yes |

TABLE 5

| Results | | | |
|---|---|---|---|
| | Spread of Filler | Oil-Bleeding | Overall |
| Comparative Example 4 | 1.5 cm | 5.2 cm | Failed |

Example 1

The homogenous mixture from Comparative Example 3 was milled twice using a Dyon-Mill (Dyno-Mill KDL Pilot, Glen Mills Inc., Maywood, N.J.) with a gap setting at 0.5 mm to form a creamy mass with significant yield stress. As shown in Table 6 below, after milling, the formulation of Comparative Example 3 showed very limited amount of oil-bleeding and spread of filler when compared to the results of the non-milled Comparative Example 3. In addition, the filler maintained its color and shape as it was before the baking test. This demonstrated the importance of micro-milling and size reduction of particles in bake-stability.

TABLE 6

| Results | | | |
|---|---|---|---|
| | Spread of Filler | Oil-Bleeding | Overall |
| Example 1 | 0.1 cm | 1.6 cm | Pass |

Example 2

Figure 3:
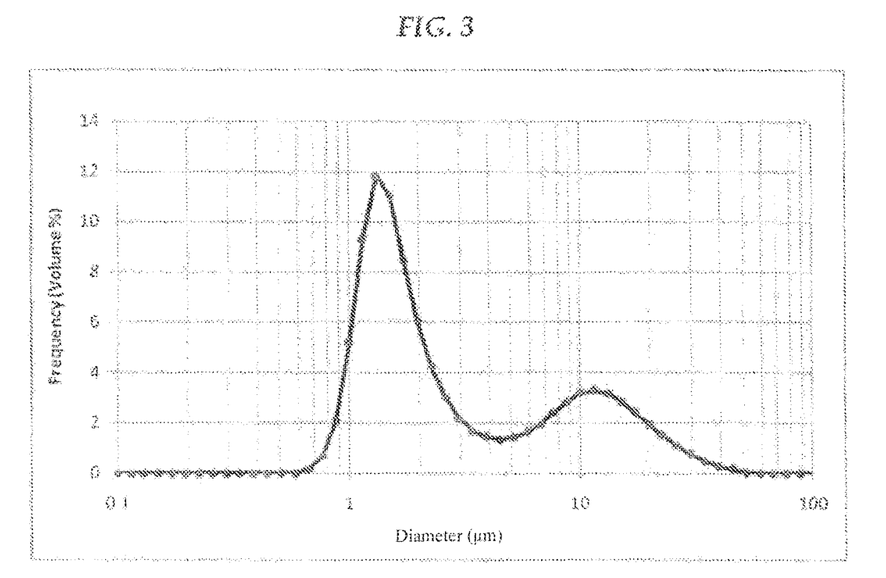
FIG. 3 is a graph of the particle size distribution of Example 2.

A cheese-flavored creamy filler was prepared by first mixing ingredients of Table 7 below with an impeller mixer and then milling the ingredients to form a creamy mixture. First, an oil blend was prepared by mixing canola oil (CV 65 Canola Oil, Cargill, Idaho Falls, Id.), melted Palm Oil (Sans Trans 39 T15, Loders Croklaan, Channahon, Ill.), Lecithin (Solec HR-2B, Solae LLC, St. Louis, Mo.), and colors together. A dry mixture of calcium stearate (CASPSK NF FCC Kosher, American International Chemical, Natick, Mass.), cheese powder (CHEEZTANG, Kraft Foods Ingredients, Memphis, Tenn.), crystalline lactose (Edible Lactose Fine Grind, Davisco Foods International, Inc., Eden Prairie, Minn.), cream powder (cream powder TC, Kerry Ingredients, Beloit, Wis.), and minor dry flavor ingredients were blended together. Then, the dry mixture was blended together with the oil blend using an impeller mixer to form a homogenous mixture. The homogenous mixture was then milled twice using a Dyon-Mill (Dyno-Mill KDL Pilot, Glen Mills Inc., Maywood, N.J.) with a gap setting of 0.5 mm to form a creamy mass with significant yield stress. A particle size analysis of the filler was completed using a Horiba particle size analyzer. A graph of the particle size distribution is provided in FIG. 3.

TABLE 7

| Formulation | |
|---|---|
| Ingredients | Amount, % |
| Low-Melting Lipids | |
| Canola Oil | 30.0 |
| Palm Oil | 9.0 |
| Lecithin | 0.3 |
| High-Melting Lipid | |
| Calcium Stearate | 5.0 |
| Hydrophilic Powders | |
| Crystalline Lactose | 30.8 |
| Cream Powder | 3.0 |
| Cheese Powder | 18.0 |
| Optional Ingredients | |
| Flavor Ingredients | 3.9 |
| Color Ingredients | 0.04 |
| Milling | Yes |

As shown in the Table 8, the bake-stable cheese filler of this Example showed only a minimum amount of spread and oil bleeding when tested with oven baking test procedure as described in Comparative Example 3.

TABLE 8

| Results | | |
|---|---|---|
| | Spread of Filler | Oil-Bleeding | Overall |
| Example 4 | 0.1 cm | 1.5 cm | Pass |

Example 3

This Example evaluates a creamy, pizza-flavored bake-stable filler. The detailed formulation is shown below in Table 9. Similar to Comparative Example 3, an oil-blend was prepared by mixing canola oil (CV 65 Canola Oil, Cargill, Idaho Falls, Id.), melted Palm Oil (Sans Trans 39 T15, Loders Croklaan, Channahon, Ill.), Lecithin (Solec HR-2B, Solae LLC, St. Louis, Mo.), and colors together. A dry mixture of calcium stearate (CASPSK NF FCC Kosher, American International Chemical, Natick, Mass.), tomato powder (Tomato Powder Stand Grind, Agusa, Lemoore, Calif.), crystalline lactose (Edible Lactose Fine Grind, Davisco Foods International, Inc., Eden Prairie, Minn.), and minor dry flavor ingredients were blended together. Then, the dry mixture was blended together with the oil-blend using an impeller mixer to form a homogenous mixture. The homogenous mixture was then milled twice using a Dyon-Mill (Dyno-Mill KDL Pilot, Glen Mills Inc., Maywood, N.J.) with a gap setting of 0.5 mm to form a creamy mass with significant yield stress. After milling, a dry blend of spice and herb was then mixed with the milled sample to form the finished filler.

TABLE 9

| Formulation | |
|---|---|
| Ingredients | Amount, % |
| Low-Melting Lipids | |
| Canola Oil | 28.0 |
| Palm Oil | 27.0 |
| Lecithin | 0.3 |
| High-Melting Lipid | |
| Calcium Stearate | 8.0 |
| Hydrophilic Powders | |
| Crystalline Lactose | 19.2 |
| Tomato Powder | 12.0 |
| Optional Ingredients | |
| Flavor Ingredients | 3.5 |
| Herb and Spices | 2.0 |
| Color Ingredients | 0.04 |
| Milling | Yes |

As shown in Table 10, the bake-stable pizza flavored filler of this Example showed only a minimum amount of spread and oil-bleeding when tested with oven baking test procedure as described in Comparative Example 3.

TABLE 10

| Results | | |
|---|---|---|
| | Spread of Filler | Oil-Bleeding | Overall |
| Example 4 | 0.1 cm | 1.8 cm | Pass |

Example 4

This experiment was completed to demonstrate that a sub-micron fraction of calcium stearate particles was generated as a result of milling under identical milling conditions used for Examples 1-3. About 25 weight percent of calcium stearate in a low-melting lipid (Neobee oil, a medium chain triglyceride from Stepan Company, Northfield, Ill.) was milled using a Dyno-mill (Dyno-Mill KDL Pilot, Glen Mills Inc., Maywood, N.J.) with a gap setting of 0.5 mm to form a creamy mass.

Four grams of milled material was dispersed in about 37 grams of acetone to make up about a 50 ml thoroughly dispersed suspension in a glass graduate cylinder. The suspension was allowed to settle at room temperature for about 15 hours. The undisturbed, settled suspension was siphoned out carefully with a pipet into about 5 equal fractions about 10 ml each in volume from the top to the bottom of the settled suspension. Each fraction was placed in small, reweighed glass vial with a screw cap for tight seal. Evaporation of acetone was minimized during the fractionation process. A control was also prepared with unmilled calcium stearate/Neobee oil mixture (obtained before milling) in identical fashion. The weight of each fractions was recorded prior to and after the complete removal of acetone by evaporating at about 55° C. in a ventilated hood. The weight percents of calcium stearate in each fraction were shown and compared to those of the control in the FIG. 4.

Figure 4:
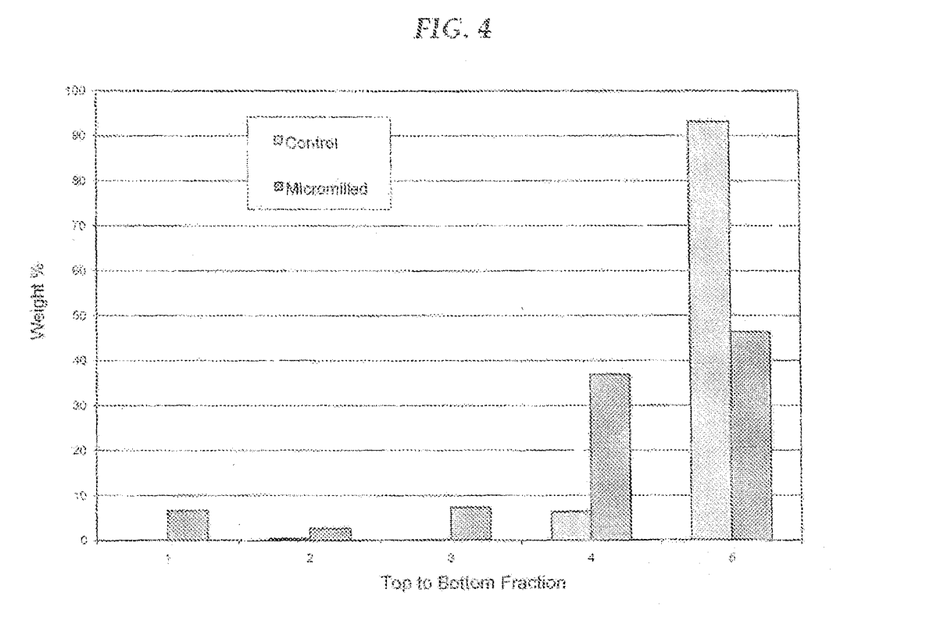
FIG. 4 is a chart of milled calcium stearate fractions.

The results suggest that a sub-micron fraction (i.e., mainly fraction #1 at the top of the settled suspension and possibly fraction #2) was generated by milling. This fraction represents at least about 5 to about 10 percent of the total calcium stearate. This sub-micron fraction is substantially absent in the (unmilled) control. It is believed that this sub-micron fraction of calcium stearate is effective for preventing hydrophilic particles (e.g., cheese, lactose) from aggregation at milling and baking temperature. It is further believed that the sub-micron fraction of calcium stearate is also at least partially responsible for the reduction of oil bleeding.

Figure 5:
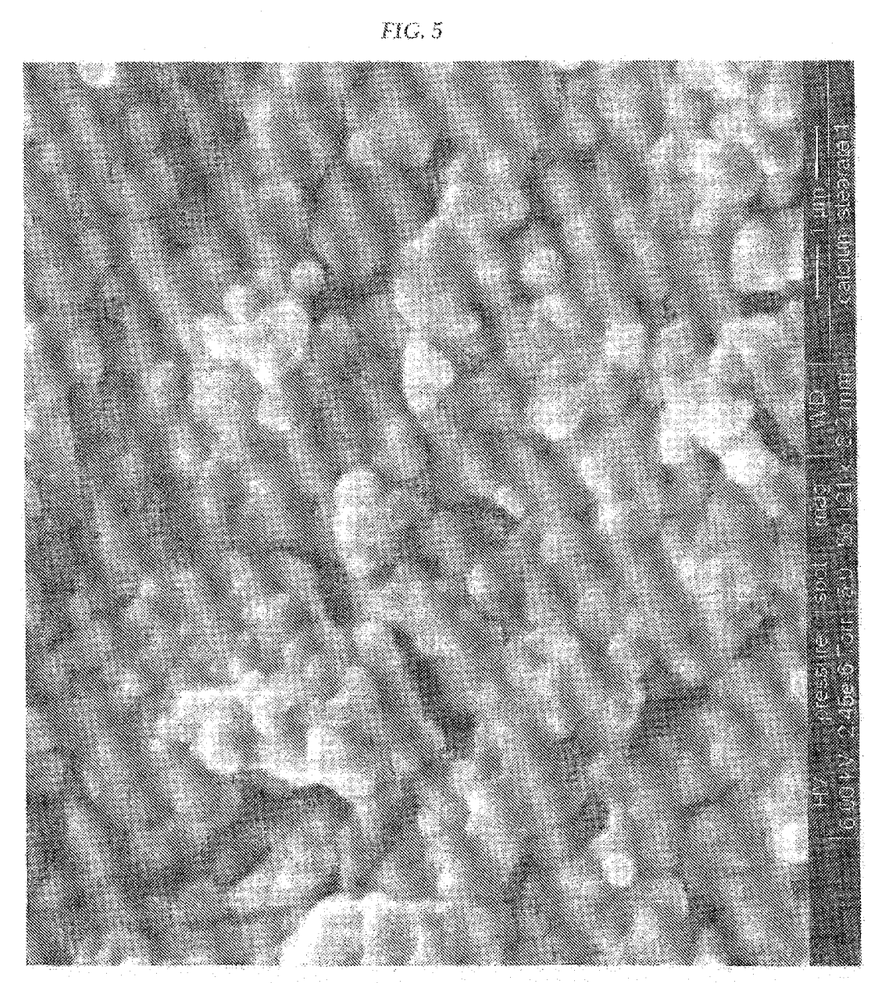
FIG. 5 is a SEM image of milled calcium stearate.

FIG. 5 shows a SEM (Scanning Electron Microscope) image of the milled calcium stearate from the top fraction number 1 of FIG. 4. FIG. 5 indicates the existence of numerous and mainly sub-micron-sized calcium stearate upon the sample being milled. The relative scale of 1 micron is shown in the legend on the lower right of the image. Thus, fraction 1 is believed to include mainly sub-micron sized particles of calcium stearate. In these images, the particles tend to stick together in oil as acetone is being removed or evaporated per the test procedure.

It will be understood that various changes in the details, materials, and arrangements of the process, formulations, and ingredients thereof, which have been herein described and illustrated in order to explain the nature of the method and resulting lipid-based fillers, may be made by those skilled in the art within the principle and scope of the embodied method as expressed in the appended claims.

What is claimed is:

1. A lipid-based, creamy food filling that is bake-stable, the creamy food filling comprising:
   a continuous lipid phase including a low-melting lipid having a melting point of about 40° C. or lower;
   a solid phase dispersed in the continuous lipid phase and including a hydrophilic powder and a high-melting lipid with a melting point of at least about 70° C.;
   a water activity of about 0.5 or lower;
   particles of the hydrophilic powder and the high-melting lipid forming a particle size distribution of the creamy food filling effective to render the creamy food filling bake stable; and
   wherein the lipid-based, creamy food filling includes substantially no polyhydric alcohol-based humectant.

2. The creamy food filling of claim 1, wherein the creamy food filling includes about 30 to about 70 percent of the hydrophilic powder, about 0.5 to about 8 percent of the high-melting lipid, and about 30 to about 70 percent of the low-melting lipid.

3. The creamy food filling of claim 1, wherein the particle size distribution is a bi-modal particle size distribution including a dust particle portion having a sub-distribution of dust particles less than about 4 microns with a sufficient amount of sub-micron dust particles of about 1 micron or less effective to render the creamy food filling bake stable and a creamy particle portion having a sub-distribution of creamy particles greater than about 4 microns.

4. The creamy food filling of claim 3, wherein the sub-micron dust particles include the high-melting lipid.

5. The creamy food filling of claim 3, wherein a ratio of the dust particle portion to the creamy particle portion is at least about 0.1.

6. The creamy food filling of claim 1, wherein a ratio of the solid phase to the continuous lipid phase is about 2.3 or less.

7. The creamy food filling of claim 1, wherein the hydrophilic powder is a cheese powder.

8. A lipid-based, creamy food filling that is bake-stable up to a filling temperature of at least about 125° C., the creamy food filling comprising:
   a continuous lipid phase including a low-melting lipid having a melting point of about 40° C. or lower;
   a solid phase dispersed in the continuous lipid phase and including a hydrophilic powder and a high-melting lipid with a melting point of at least about 70° C.;
   a water activity of about 0.5 or lower;
   particles of the hydrophilic powder and the high-melting lipid forming a particle size distribution including an amount of submicron high-melting lipid particles having a size of about 1 micron or less effective to render the creamy food filling bake-stable up to a filling temperature of about 125° C.; and
   wherein the lipid-based, creamy food filling includes substantially no polyhydric alcohol-based humectant.

9. The creamy food filling of claim 8, wherein the particle size distribution is a bi-modal particle size distribution including a dust particle portion having a sub-distribution of dust particles less than about 4 microns and including the submicron high-melting lipid particles and a creamy particle portion having a sub-distribution of creamy particles greater than about 4 microns.

10. The creamy food filling of claim 9, wherein a ratio of the dust particle portion to the creamy particle portion is at least about 0.1.

11. The creamy food filling of claim 8, wherein a ratio of the solid phase to continuous lipid phase is about 2.3 or less.

12. The creamy food filling of claim 8, wherein the hydrophilic powder is a cheese powder.

13. A lipid-based, creamy food filling that is bake-stable, the creamy food filling comprising:
   a continuous lipid phase including a low-melting lipid having a melting point of about 40° C. or lower;
   a solid phase dispersed in the continuous lipid phase and including a hydrophilic powder and a high-melting lipid with a melting point of at least about 70° C.;
   a water activity of about 0.5 or lower;
   a bi-modal particle size distribution of the hydrophilic powder and the high-melting lipid including one mode of a dust particle portion having a sub-distribution of dust particles, the bi-modal particle size distribution of the creamy food filling rendering the creamy food filling bake stable; and
   wherein the lipid-based, creamy food filling includes substantially no polyhydric alcohol-based humectant.

14. The creamy food filling of claim 13, wherein the creamy food filling includes between about 30 and about 70 percent by weight of the hydrophilic powder, about 0.5 to about 8 percent by weight of the high-melting lipid, and between about 30 and about 70 percent by weight of the low-melting lipid.

15. The creamy food filling of claim 13, wherein a ratio of the solid phase to the continuous lipid phase is about 2.3 or less by weight.

16. The creamy food filling of claim 13, wherein the hydrophilic powder has a crystalline to amorphous ratio of about 0.5 or greater by weight of the total filling.

17. The creamy food filling of claim 13, wherein the dust particle portion includes sub-micron dust particles of about 1 micron or less.

18. The creamy food filling of claim 17, wherein a ratio of the dust particle portion to the creamy particle portion is at least about 0.1 by volume.

19. The creamy food filling of claim 13, wherein the hydrophilic powder is a cheese powder.

20. A lipid-based, creamy food filling that is bake-stable, the creamy food filling comprising:
- a continuous lipid phase including a low-melting lipid having a melting point of about 40° C. or lower;
- a solid phase dispersed in the continuous lipid phase and including a hydrophilic powder and a high-melting lipid with a melting point of at least about 70° C.;
- a water activity of about 0.5 or lower; and
- particles of the hydrophilic powder and the high-melting lipid forming a particle size distribution of the creamy food filling effective to render the creamy food filling bake stable;
- wherein the particle size distribution is a bi-modal particle size distribution including a dust particle portion having a sub-distribution of dust particles less than about 4 microns with a sufficient amount of sub-micron dust particles of about 1 micron or less effective to render the creamy food filling bake stable and a creamy particle portion having a sub-distribution of creamy particles greater than about 4 microns,
- wherein the dust particle portion includes at least about 0.1 volume percent of the sub-micron dust particles; and
- wherein the lipid-based, creamy food filling includes substantially no polyhydric alcohol-based humectant.

21. The creamy food filling of claim 20, wherein the hydrophilic powder is a cheese powder.

22. A lipid-based, creamy food filling that is bake-stable, the creamy food filling comprising:
- a continuous lipid phase including a low-melting lipid having a melting point of about 40° C. or lower;
- a solid phase dispersed in the continuous lipid phase and including a hydrophilic powder and a high-melting lipid with a melting point of at least about 70° C.;
- a water activity of about 0.5 or lower; and
- particles of the hydrophilic powder and the high-melting lipid forming a particle size distribution of the creamy food filling effective to render the creamy food filling bake stable;
- wherein the particle size distribution is a bi-modal particle size distribution including a dust particle portion having a sub-distribution of dust particles less than about 4 microns with a sufficient amount of sub-micron dust particles of about 1 micron or less effective to render the creamy food filling bake stable and a creamy particle portion having a sub-distribution of creamy particles greater than about 4 microns; and
- wherein the lipid-based, creamy food filling includes substantially no polyhydric alcohol-based humectant.

23. The creamy food filling of claim 22, wherein the hydrophilic powder is a cheese powder.

24. A method of forming a lipid-based, creamy food filling that is bake-stable up to a temperature of at least about 125° C., the method comprising:
- blending a hydrophilic powder, a high-melting lipid with a melting point of at least about 70° C., and a low-melting lipid having a melting point of about 40° C. or below to form a blended mixture, the blended mixture including substantially no polyhydric alcohol-based humectant; and
- milling the blended mixture to form a bi-modal particle size distribution of the hydrophilic powder and the high-melting lipid including one mode of a dust particle portion having a sub-distribution of dust particles, the bi-modal particle size distribution of the creamy food filling rendering the creamy food filling bake stable.

25. The method of claim 24, wherein the creamy food filling includes about 30 to about 70 percent of the hydrophilic powder, about 0.5 to about 8 percent of the high-melting lipid, and about 30 to about 70 percent of the low-melting lipid.

26. The method of claim 24, wherein a ratio of the solid phase to the continuous lipid phase is about 2.3 or less.

27. The method of claim 24, wherein the hydrophilic powder has a crystalline to amorphous ratio of about 0.5 or greater by weight of the total filling.

28. The method of claim 24, wherein the hydrophilic powder has a crystalline to amorphous ratio of about 1.5 or greater by weight of the total filling.

29. The method of claim 24, wherein additional ingredients are blended with the low-melting lipid, hydrophilic powder, and high-melting lipid mixture before the milling.

30. The method of claim 24, wherein additional ingredients are blended with the low-melting lipid, hydrophilic powder, and high-melting lipid mixture after the milling.

31. The method of claim 29, wherein the additional ingredients are selected from the group consisting of flavor additives, color compounds, moisture bearing substances, thermally unstable substances, dry flavor ingredients, and mixtures thereof.

32. The method of claim 29, wherein the additional ingredients are selected from the group consisting of annatto extract, paprika extract, wheat flour, amorphous corn solids, nuts, chocolate, candy, fruit, vegetable, herbs, spices, and mixtures thereof.

33. The method of claim 29 wherein the additional ingredients are selected from the group consisting of flavor additives, color compounds, moisture bearing substances, thermally unstable substances, dry flavor ingredients, and mixtures thereof.

34. The method of claim 29 wherein the additional ingredients are selected from the group consisting of annatto extract, paprika extract, wheat flour, amorphous corn solids, nuts, chocolate, candy, fruit, vegetable, herbs, spices, and mixtures thereof.

35. The method of claim 24, wherein the hydrophilic powder is a cheese powder.

* * * * *

UNITED STATES PATENT AND TRADEMARK OFFICE
CERTIFICATE OF CORRECTION

PATENT NO. : 9,456,620 B2  
APPLICATION NO. : 14/190206  
DATED : October 4, 2016  
INVENTOR(S) : Loh et al.

Page 1 of 1

It is certified that error appears in the above-identified patent and that said Letters Patent is hereby corrected as shown below:

In the Claims

Column 20, Line 43, Claim 33, after "claim," delete "29" and insert -- 30 --.

Column 20, Line 48, Claim 34, after "claim," delete "29" and insert -- 30 --.

Signed and Sealed this  
Ninth Day of May, 2017

Michelle K. Lee  
*Director of the United States Patent and Trademark Office*